J. S. OSBORNE.
BAKING OVEN.
APPLICATION FILED MAR. 22, 1917.
1,278,200.
Patented Sept. 10, 1918.
2 SHEETS—SHEET 1.
Fig. 1.
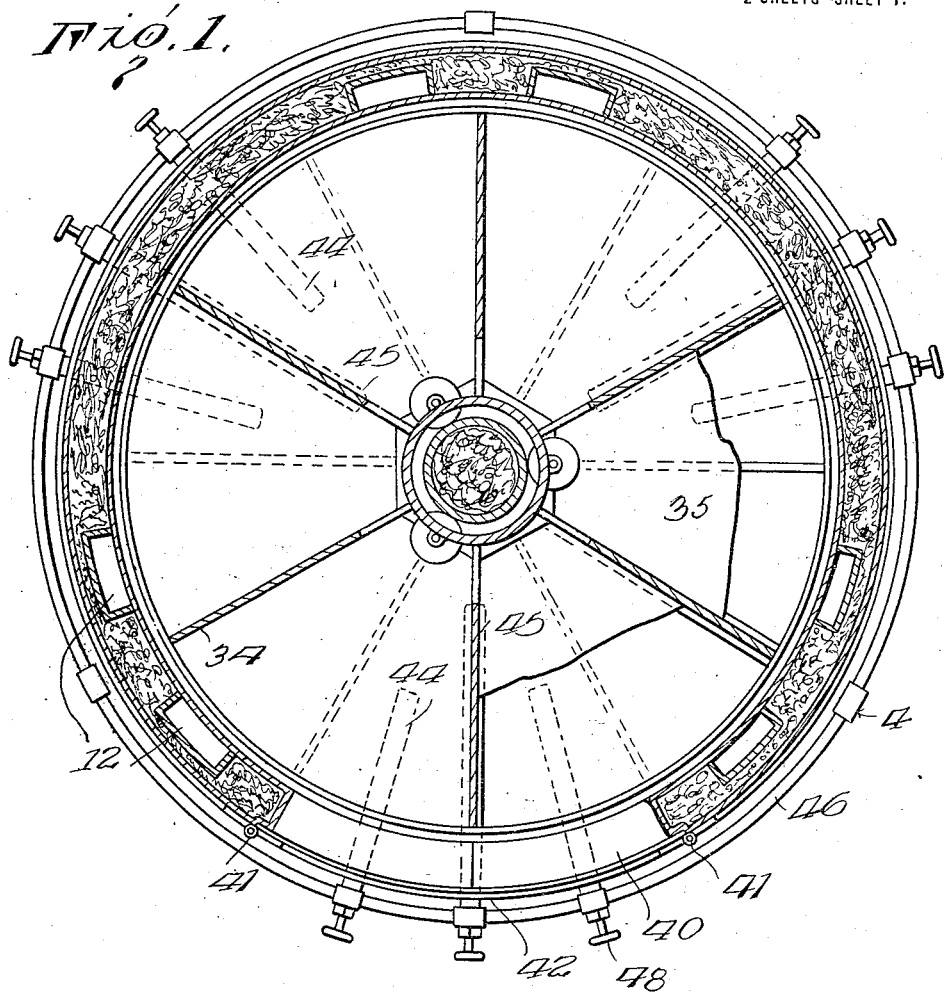
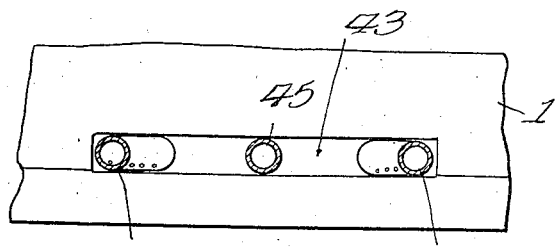
Fig. 5.
John S. Osborne
Inventor
By Geo. P. Kimmel
Attorney

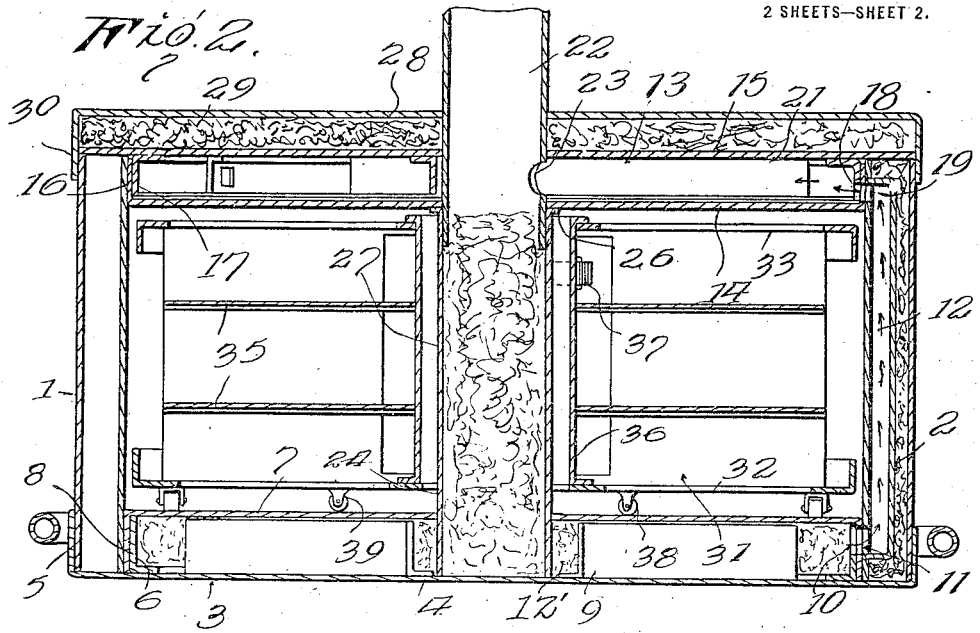
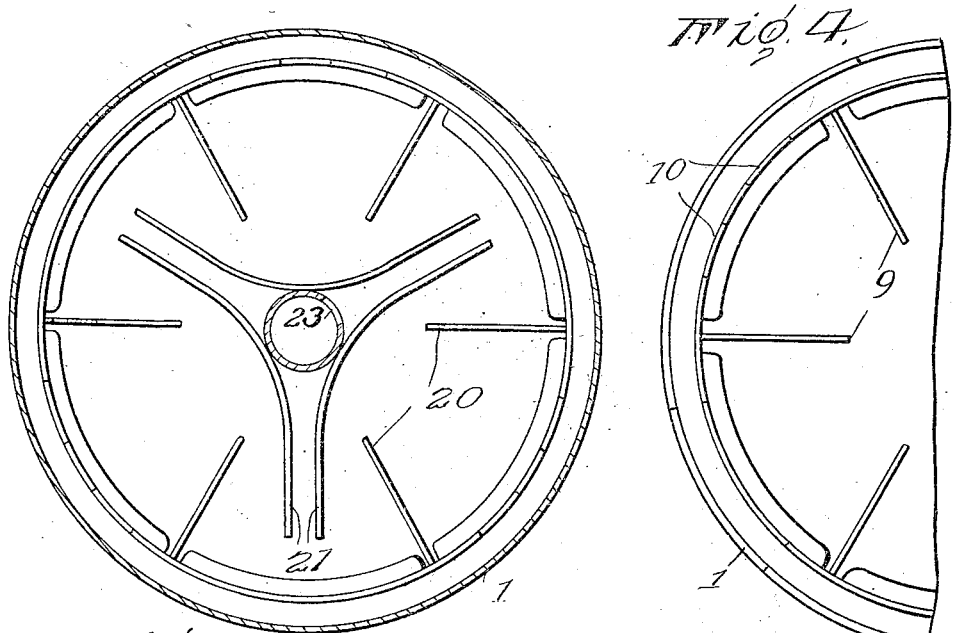

UNITED STATES PATENT OFFICE.

JOHN S. OSBORNE, OF STOCKTON, CALIFORNIA.

BAKING-OVEN.

1,278,200.

Specification of Letters Patent. Patented Sept. 10, 1918.

Application filed March 22, 1917. Serial No. 156,638.

*To all whom it may concern:*

Be it known that I, JOHN S. OSBORNE, a citizen of the United States, and resident of Stockton, in the county of San Joaquin and State of California, have invented certain new and useful Improvements in Baking-Ovens, of which the following is a specification.

This invention relates to stoves and has more especial reference to an improved baking oven.

The dominant object of the invention is to provide a baking oven particularly adapted for use in baking various pastries, so constructed as to produce a heat of uniform tensity throughout the entire baking area, thus, insuring proper baking and coloring of the pastries and allowing the same to be baked evenly and thoroughly.

Another object of the invention and one of equal importance is to provide a baking oven which has those parts of the same as subjected to the atmosphere insulated, thereby, preventing the escape of heat from the oven and as a consequence, rendering the same economical and requiring but a minimum amount of fuel to heat the same to a maximum temperature.

Another object of the invention is to provide novel pan supporting means within the oven construction, the said means being adapted to rotate and having a plurality of pan receiving chambers therein, whereby, the same may be successively moved into register with the door of the oven to allow the placing and removing of dough and baked products therefrom, thus, protecting those chambers as not registered with the door opening from the resultant inrush of air.

A further object of the invention is to provide heat circulating means, whereby, the heated air will be caused to engage the top and bottom portions of the oven during the circulation of the same.

Other objects relate to the considerations of economy of production, installation and maintenance, durability in use, and convenience in operation of the several parts entering into the construction of elements and the above defined general organization of said elements.

All of the foregoing together with additional advantageous details and arrangements of parts of the preferred embodiment of my invention will be clear from the specific description hereinafter contained, when read in connection with the accompanying drawings forming a part thereof, wherein said embodiment of the invention is illustrated for the purpose of facilitating a full understanding of the present improvements.

In the drawing:

Figure 1 is a horizontal section through my improved baking oven;

Fig. 2 is a vertical section therethrough;

Fig. 3 is a detail in bottom plan of the upper heating chamber;

Fig. 4 is a fragmentary detail in top plan of the bottom heating chamber; and Fig. 5 is a fragmentary detail in elevation showing the arrangement of the gaseous fuel burners within the oven, the said burners being shown in section.

Referring now more particularly to the several figures of the said drawings wherein like reference numerals will refer to the same parts throughout the several views, there is provided a double wall annular housing element indicated by the numeral 1, which element has arranged between the several walls thereof heat insulating packing 2, such as asbestos wool, fire-clay or the like.

Within the lower portion of the annular housing element 1 a lower heat chamber designated in its entirety by the numeral 3 is arranged and comprises a disk like plate 4, the outer marginal edges of which are flanged as at 5 and adapted to snugly engage the outer surface of the said annular housing element 1 while a second flange 6 is also formed upon the plate 4, concentric to the flange 5 and is adapted to snugly engage the inner side of the housing element 1. Within the disk like member 4, a second member 7 complemental in size and shape is arranged and has formed upon its marginal edge a downwardly turned flange 8, this flange being adapted to be received between the adjacent faces of the flange 6 and the housing element 1. A plurality of radially disposed baffle or heat deflecting plates 9 are arranged between the members 4 and 7, extending to a point in proximity of the center of the same, the purpose of which will be hereinafter more fully apparent. Pairs of openings 10 and 11 are formed within the flanges 6 and 8 of the members 4 and 7 respectively and in the inner wall of the annular housing element 1 and are normally registered in order that air will be permitted to pass through the same from the lower heat chamber 3 into a plurality of vertically disposed grooves, generally indicated by the numeral 12 as arranged in the heat insulating material 2 of the housing element 1 and extending approximately throughout the entire height of the said housing. Suitable heat insulating material 12' is placed between the members 4 and 7.

Upon the upper portion of the annular member 1, there is arranged an upper heat chamber indicated in its entirety by the numeral 13, the said heat chamber being formed of a plurality of superposed disks 14 and 15, the edges of which have flanges 16 and 17 formed thereon and extended in opposite directions, whereby, the said disks may be snugly nested. Openings 18 and 19 are formed within the flanges 16 and 17 and the inner wall of the annular housing member 1 and are arranged in a manner similar to the openings 10 and 11, thereby, providing an outlet for the various flues 12 and permitting the air as conveyed thereby to be discharged into the upper heat chamber 13. Within the heat chamber 13, intermediate the several disks 14 and 15, a plurality of radially disposed baffle or deflecting plates 20 are arranged and extend to a point of proximity of the center of the plates, while extending from the center of the said upper heat chamber and intermediate the several disks thereof are other curved deflecting elements indicated by the numeral 21, these elements comprising curved strips which are so arranged as to have the ends thereof intermediate certain of the various baffle plates 20. Within the baffle plates 20 in proximity of their jointure with the flange 17 openings 20' are formed and serve to permit the circulation of the heated air about the extreme outer portions of the baking area of the oven construction. An opening is formed concentrically of the upper heat chamber 13 and is adapted to receive therein a discharge flue or chimney 22, whereby the exhausted products of combustion may be thoroughly removed from the several heat chambers and also to produce an efficient draft therethrough, it being noted that the said chimney 22 is provided with a plurality of openings 23 which openings are arranged adjacent the heat circulating space in the said upper heat chamber 13.

To efficiently support the chimney 22 in proper position with relation to the heat chamber 13 and to brace the center portion of each of the said heat chambers 3 and 13, a tubular cylindrical body 24 is arranged concentrically thereof and has the lower extremity thereof secured to the upper face of the disk 4 of the lower heat chamber 3 through the medium of rivets or other suitable fastening devices, the disk 7 having an opening formed concentrically thereof for snugly receiving the said body therethrough. The upper extremity of the body 24 is also flanged as at 26 whereby the same may be engaged with the adjacent portion of the disk 14 of the upper heat chamber 13 and telescopes with the lower extremity of the chimney 22. To render the tubular body 24 solid and to insulate the same, suitable heat insulating material 27 is arranged and packed within the same, thus lending to the rigidity of the same and also preventing the cooling of the oven by reason of the continuous draft through the chimney 22 from the several heat chambers of the oven construction.

An annular double wall cover plate 28 having heat insulating material 29 arranged therein is adapted for disposition upon the upper portion of the annular housing member 1 and the upper heat chamber 13, while to maintain the same in position thereupon, a depending flange 30 is formed upon the peripheral edge of the said plate 28 and snugly engages the outer wall of the said housing 1. To permit the passage of the chimney 22 through the cover plate 28 an opening is formed concentrically of the same and obviously, is of a size and shape to correspond to the size and shape of the chimney 22 in order that a close jointure of the same will be produced.

With a view toward providing means whereby the various pastry containing receptacles may be supported within the baking chamber of the oven construction, there is provided an annular supporting rack indicated in its entirety by the numeral 31 and comprising upper and lower annular plates 32 and 33, the marginal edges of which are preferably flanged and disposed toward each other, while to maintain the said plates in rigid spaced apart relation, a plurality of partition walls 34 are arranged between the same to provide a plurality of segmental chambers into which the pastry containing trays may be placed. To support the pastry containing trays, cleats 35 are arranged upon the opposite faces of the partition walls 34 and as will be appreciated, serve to slidably support the same thereon. A cylindrical sleeve 36 is arranged concentrically of the annular rack 31 and carries thereupon a plurality of rollers 37, which rollers are adapted to bear upon the peripheral portion of the cylindrical body 24 arranged within the oven baking chamber. By so engaging the various rollers 37 with the pillar 24, the rotatable rack 31 will be maintained at all times in spaced apart relation therefrom and therefore, will be permitted to rotate freely. To facilitate the rotation of the rack 31 other rollers 38 are rotatably supported within a plurality of bearing brackets 39 as affixed to the under face of the lower plate 32 of the said rack construction and are adapted to travel upon the upper face of the disk 7 of the lower heat chamber 3. By this means, the rack may be shifted from one position to another to enable the placing and removing of dough and bake pastries.

Within one portion of the annular housing member 1 an opening is formed and is adapted to be normally closed by means of double walled doors 40, the said doors being hingedly mounted to a portion of the casing member as at 41 and having their adjacent ends engaged by a suitable latch member 42, whereby the same will be normally maintained in closed position.

At intervals a plurality of elongated slots 42 are arranged about the annular housing member 1 and are adapted to receive therein radially disposed gaseous fuel burners 44 and 45, it being noted that the burners 45 are of a greater length than the burners 44, thus extend to a point in proximity of the rear portions of the various tray receiving chambers of the rotatable rack 31. To supply the various gaseous fuel burners 44 and 45 with fuel, an annular pipe 46 is arranged about the casing member 1 and has tapped thereinto at various points throughout its length a plurality of mains 47. By so engaging the various mains 47 with the supply pipe 46, it will be understood that an even flow of gas into the various burners as interposed therein will be afforded and hence, will enable the same to produce an even heat within the baking chamber of the oven construction. Valves 48 are arranged upon each of the gaseous fuel burners 44 and 45, and obviously, serve as means for governing the flow of gaseous fuel therethrough.

In operation, when it is desired to heat my improved oven construction, the various burners 44 and 45 are ignited by suitable means, whereupon, that air as flowing through the heat chambers 3 and 13 and the various flues 12 will be heated, thus, bringing the temperature within the baking chamber of the oven to the desired degree. By reason of the baffle plates 9 and 20 as arranged within the heat chambers 3 and 13, respectively, together with the deflecting plate 21 of the heat chamber 13, the heated air will be caused to thoroughly circulate about the top and bottom portions of the outer chamber while the sides thereof will be thoroughly and evenly heated by means of the various flues 12 as arranged about the annular housing member 1. Those walls of the oven construction as are packed with the heat insulating material will, as will be appreciated, prevent the reducing of the temperature, even slightly, within the baking chamber of the oven and by this arrangement, it is manifest that the oven will be exceedingly economical in its consumption of fuel and further, that but a minimum amount of fuel will be required to bring the heating chamber of the same to its maximum temperature. To place the pastry dough within the baking chamber of the oven, the doors 40 are swung to their open positions whereupon the rotatable rack 31 is moved to a position whereat one of the tray receiving chambers thereof will be alined with the door way. At this time, the dough containing trays may be readily moved into engagement with the several rows of cleats 35 as secured to the partitions 34 and the doors then closed to permit the baking process to be carried on. Should it be desired to entirely fill the baking chamber of the oven with pastry dough, it will be readily understood that upon the placing of the proper number of dough containing trays within one of the tray receiving chambers of the rack 31, the rack may be then rotated to bring another of the said chambers in alinement with the door way whereupon it may be filled, and in turn, yet another receiving chamber brought into alinement until the entire rack has been filled. The baked pastry may be removed from the rotatable rack in a similar manner and it is to be noted, that those tray receiving chambers as not alined with the doorway will not be affected by the resultant inrush of air and as a consequence, the baking process therein will not be affected.

From the foregoing, it will be appreciated to workers in the art that I have provided an exceedingly simple and efficient baking oven and one which, by reason of its construction will thoroughly and efficiently bake various pastries and other food stuffs. Further, the construction by reason of its even flow of heat over the entire baking area will materially lessen the liability of burning of the various food stuffs or pastries and will also permit the same to be colored to the desired extent.

The construction may also be readily disassembled for cleaning or repairing purposes and by reason of its sectional construction may have parts thereof readily replaced when the same has become broken or unfit for use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language might be said to fall therebetween.

I claim:

1. In an oven, a housing element comprising a plurality of spaced apart walls, heat insulating material arranged between said walls, upper and lower heat chambers arranged within said housing element, the heat chamber comprising flanged disks, heat baffling means arranged in each of the heat chambers, means arranged in said housing element for supporting and bracing the intermediate portions of the heat chambers, and heat conducting flues arranged in the heat insulating material of the housing element and communicating with the upper and lower heat chambers.

2. In an oven, an annular baking chamber, upper and lower heat chambers, heat conducting flues arranged adjacent the baking chamber side walls and communicating with the upper and lower heat chambers, guide means arranged centrally of the baking chamber, a tray supporting rack also arranged in the baking chamber and rotatable about the guide means, and means carried by said tray supporting rack engageable with the guide means for maintaining the same in spaced apart relation therefrom.

3. In an oven, an annular baking chamber, upper and lower heat chambers, said heat chambers comprising superposed flanged plates arranged in spaced apart relation, baffling means arranged between said plates, heat conducting flues arranged adjacent the baking chamber side walls and communicating with the upper and lower heat chambers, a guide means arranged centrally of the baking chamber, and a tray supporting rack rotatable about said guide means.

4. In an oven, an annular baking chamber, upper and lower heat chambers, said heat chambers comprising nested flanged plates, a plurality of heat deflecting means arranged in said upper and lower heat chambers, heat conducting flues arranged adjacent the baking chamber side walls and communicating with the upper and lower heat chambers, a guide means arranged centrally of the baking chamber, a tray supporting rack having a plurality of partitions therein also arranged in the baking chamber and adapted to rotate about said guide means, and means carried by the tray supporting rack engaged with the guide means for maintaining the same in spaced apart relation therefrom.

5. In an oven, an annular housing, said housing comprising a plurality of spaced walls, heat insulating means arranged between said walls, upper and lower heat chambers in the housing, said heat chamber comprising a plurality of superposed flanged plates, heat baffling means arranged in said upper and lower heat chambers, a plurality of heat conducting flues arranged in the heat insulating material of the housing and communicating with the upper and lower heat chamber, guide means arranged centrally of the base of the housing, a tray supporting rack arranged within the housing and adapted for rotation about said guide means, and a doubled walled heat insulated cover plate arranged over the upper portions of said housing and upper heat chamber.

6. In an oven, an annular housing comprising a plurality of spaced walls, heat insulating means arranged between said walls, a door arranged in one side of the housing, upper and lower heat chambers in the housing, said heat chambers comprising pairs of superposed flanged disks, heat baffling means arranged in said upper and lower heat chambers, a plurality of vertically disposed heat conducting flues arranged in the heat insulating material of the housing and communicating with the upper and lower heat chambers, a hollow collar containing heat insulating material arranged centrally of the housing, a flue supported on the upper end of said collar communicating with the upper chamber, an annular rack rotatably mounted in the housing, and a centrally disposed tubular guide arranged on said rack and received about said collar.

In testimony whereof I affix my signature hereto.

JOHN S. OSBORNE.

Copies of this patent may be obtained for five cents each, by addressing the "Commissioner of Patents, Washington, D. C."